June 13, 1967 G. DOSAMANTES DE JOSÉ ETAL 3,324,829
CABINET TYPE AQUARIUMS
Filed Oct. 22, 1965 2 Sheets-Sheet 1

INVENTORS
GUADALUPE DOSAMANTES DE JOSÉ
ANA MARIA DOSAMANTES
*Imrie & Smiley*
Attys.

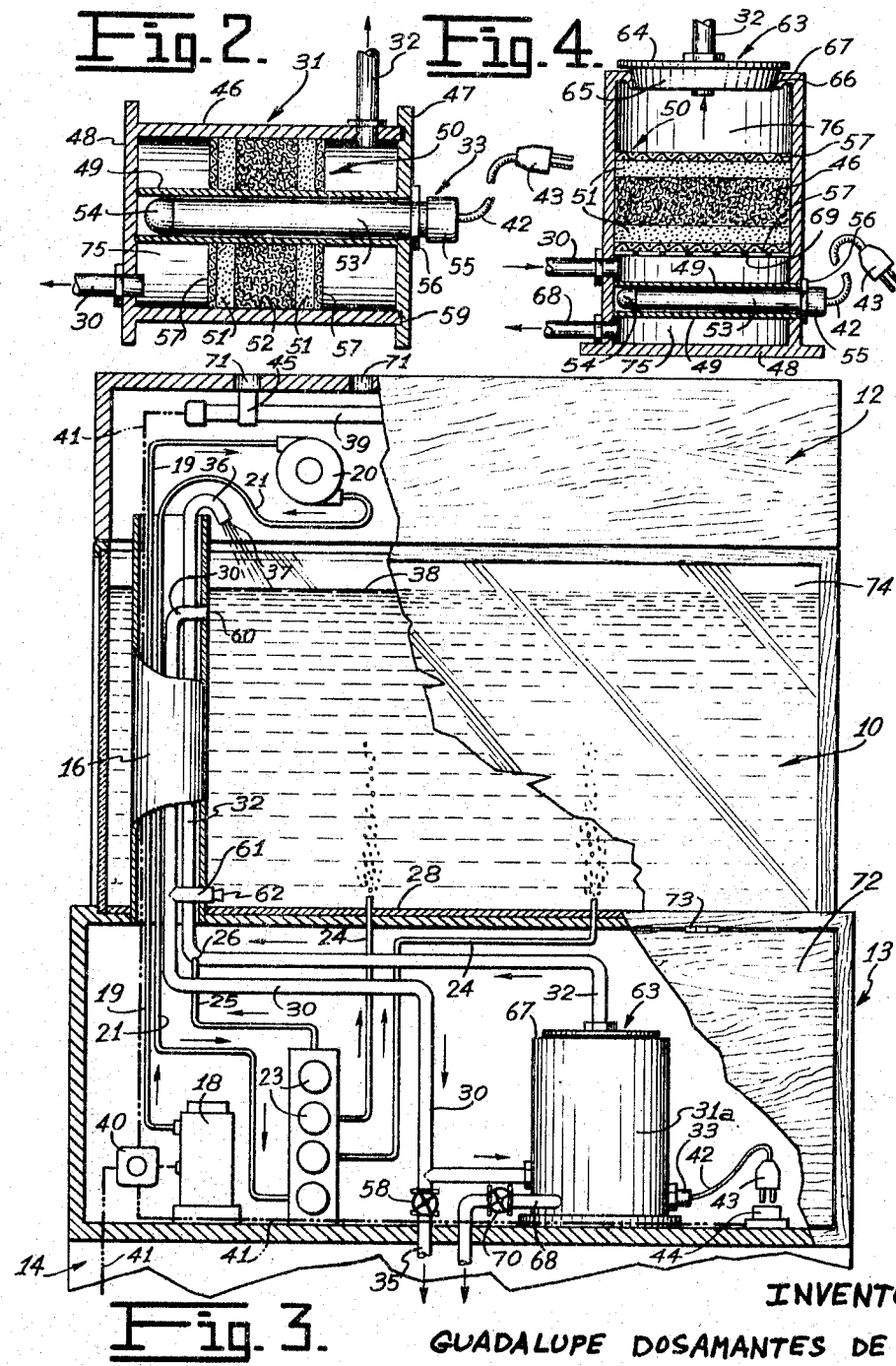

United States Patent Office 3,324,829
Patented June 13, 1967

3,324,829
CABINET TYPE AQUARIUMS
Guadalupe Dosamantes de José and Ana Maria Dosamantes, both of Comonfort 15—9, Mexico City, Mexico
Filed Oct. 22, 1965, Ser. No. 500,888
Claims priority, application Mexico, June 15, 1965, 82,937
7 Claims. (Cl. 119—5)

The present invention relates to display aquariums and, more particularly, to improved cabinet type display aquariums highly suitable to be installed in private homes or in exhibition rooms.

In aquariums available in the common market, nearly all ducts for fluid transfer, as well as cables for the conduction of electrical energy are provided such that they are completely visible from the outside, thereby materially precluding the external appearance of an aquarium, so that it is generally necessary to place the aquarium against a wall in order to conceal as much as possible the equipment and the several operational devices contained therein, which restricts the application of aquariums.

Also, as is well known, a great amount of equipment is necessary to provide aeration of the water contained within the aquarium, to heat the same in order to maintain a constant temperature therein, and to light the water containing receptacle of the aquarium in an attractive and efficient manner. In order to achieve the above goals, it has generally been necessary, in the past, to arrange equipment to pressurize air to be bubbled into the water contained in a transparent container, thereby requiring the use of air pumps, tubes, valves, filters and a great amount of equipment and accessories which in the prior art aquariums are not sufficiently masked in detriment of the general good appearance of the assembly.

In the copending U.S. patent applications Ser. Nos. 351,972 and 395,766, now Patents 3,232,271 and 3,232,272, respectively, applicants have described and claimed aquariums where it has been possible to completely conceal all the installations, and wherein several elements, such as a chamber in the lower portion of the aquarium and hollow tubular structural elements through which the ducts carrying water, air or other fluids concealingly pass, have been incorporated.

Also, in the above identified U.S. patent applications, the aquariums have been provided with safety elements to avoid the water, in case of an air pump stoppage, to reach said pump and any other delicate element of the pneumatic system, and to thereby avoid temporary or permanent damage to the above mentioned pneumatic system.

The present invention is a remarkable advance in the art, and it constitutes an improvement over all existing aquariums of the prior art including those described and claimed in the above referred to applications.

One of the main problems generally encountered by manufacturers and users of aquariums, is the water cleaning or filtration operation, as well as the maintenance of a reasonably constant suitable temperature for the welfare of the living creatures in the aquarium by controlling the temperature of the water which constitutes their environment.

In order to filter and clean the water in the existing aquariums, hereinbefore, it has been generally necessary to install conventional water filters, within the water container, or in a projection thereof, provided that the filters could be located adjacent the bottom of the receptacle. Therefore, the filters were installed in the body of water so that, by the entrainment caused by air streams pressurized by the corresponding pump, the water was forced through said filters to remove the undesirable materials and be recirculated to the main body of liquid.

The above system had the great disadvantage that actually there was no effective circulation of the water and therefore, in certain zones, particularly those far away from the filtration units within the receptacle, the liquid was not efficiently cleaned since this water was stagnant, while in other zones, particularly those in the neighborhood of the filtration system, the water was completely cleaned, which caused a lack of uniformity in the appearance of the liquid contained in the container.

On the other hand, the heating system used hereinbefore, has been defective in that it was comprised by one or more tubular heaters which were left in some place, within the container, so that, if the latter was sufficiently large, it was necessary to provide a correspondingly large amount of such elements, evenly distributed such that the whole of the liquid contained in the container could be uniformly heated to a suitable temperature for the comfort of the living creatures, minimizing the existence of overheated or underheated zones.

The efficiency of the above described heating systems has left much to desire, and therefore it has been for long desirable to provide, in this type of aquariums, a heating system which, while being very simple and economic, will cause a very homogeneous uniform heating of all the water throughout the container.

Having in mind the defects of the prior art aquariums, it is an object of the present invention to provide an improved cabinet type aquarium wherein all the equipment and accessories, as well as the fluid conducting ducts and electrical conducting wires are completely concealed in order to give a very attractive appearance to the aquarium.

A further object of the present invention is to provide an improved aquarium of the above character, wherein a safety means is installed to avoid water entrance into the pneumtaic system, and which is of a very simple and economic construction and operation.

Another object of the present invention is to provide an aquarium of the above character which is also provided with lighting devices, concealed to avoid glares to observers and which nevertheless will light the scene in a very efficient uniform manner.

A still further and more important object of the present invention is to provide, in an aquarium of the above character, a centralized filtration and water cleaning system which includes a heating system therein, in order to simultaneously filter and maintain the temperature of the water, together with recirculating and aerating means to provide for a completely uniform homogeneous condition throughout the liquid.

The foregoing objects and others ancillary thereto are preferably accomplished, in accordance with a preferred embodiment of the invention, by providing in a cabinet type unitary aquarium which comprises a lower cabinet, a chamber placed on said cabinet to contain all the operational equipment for the aquarium, a transparent container for water, ornaments and living creatures placed in said container, and a top cover hinged to one of the upper edges of said transparent container: a centralized unitary system for filtering, heating, aerating and circulating the water into and from said transparent vessel, and an upstanding rigid pipe with open ends communicating said chamber and the space within said top cover to provide for the passage of all ducts, lead wires, water pipes and the like from said chamber to said cover.

The novel features that are considered characteristic of this invention are set forth with particularity in the appended claims. The invention itself, however, both as to its organization and its method of operation, together with additional objects and advantages thereof, will best be understood from the following description of specific embodiments when read in connection with the accompanying drawings, wherein:

FIG. 2 is a cross-sectional longitudinal elevational view of the filtering and heating unit of the aquarium shown in FIG. 1;

FIG. 3 is a fragmentary partially broken away elevational view of an aquarium built in accordance with a second embodiment of the invention; and FIG. 4 is a cross-sectional elevational view of the filtering and heating equipment incorporated in the aquarium of FIG. 3.

Figure 1:
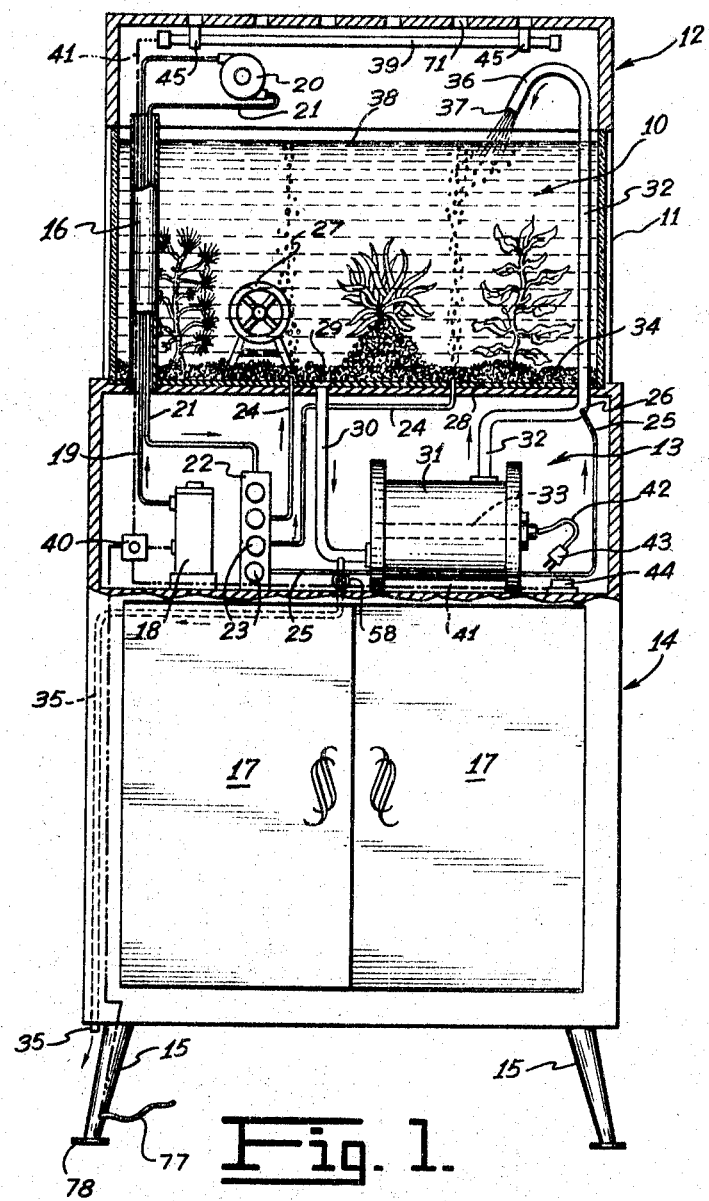
FIG. 1 is a front elevational view, with portions broken away to show inner details, of an aquarium built in accordance with an embodiment of the invention.

Having now more particular reference to the drawings, and specifically to FIGS. 1 and 2 thereof, there is shown an improved aquarium built in accordance with a preferred embodiment of the invention, which comprises a transparent container 10, built of transparent panels 74 made of glass or any other transparent suitable plastic material, provided with structural members 11 forming a frame therefor which, if desired, can be used to carry some of the conduits for fluid transfer which in the present embodiment are concealed by passage thereof through a pipe as will be fully described hereinafter.

Under the container 10, a lower chamber 13 built of an opaque material such as wood, non-transparent plastic materials, metal or the like is provided. Chamber 13 is provided also with doors 72, see FIG. 3 for example, at the front or back to give access to the several pieces of equipment installed therewithin and to conceal this equipment from observers, said doors being provided with hinges 73. A cabinet 14 is provided under chamber 13, said cabinet containing doors 17, and being able to be used as a liquor storage cabinet or the like. Cabinet 14 gives the unit a unitary very pleasant appearance enabling installation in a private home to match with the furniture thereof. Cabinet 14 is supported in a plurality of legs 15 with suitable plate bases 78 at the lower end thereof. One of the above legs is provided with a bore through which an electric lead wire 77 passes so that the only portion of the operational equipment which is visible from the outside, besides the bleeding hose 35 which will be described below, is a length of electric cable 77 which is provided to be inserted into an electric receptacle of any type.

The transparent container or tank 10 of the aquarium in accordance with the present embodiment of the invention is covered with a top cover 12 hinged to one of the upper edges of the frame 11. Within said top cover a lighting device 39 is provided supported by suitable brackets 45 and connected by lead wires 41 to a current distributing box 40 which in turn is connected by other lead wires 41 to the electric cable 77 leaving the aquarium through one of the legs 15 accordance with the above. The top cover is also built of an opaque material and can be provided with a reflecting or partially reflecting inner surface in order to provide for a suitable and pleasant lighting of the transparent container 10 to give a clear view of all living creatures, ornaments and accessories contained therein. Top cover 12 is also provided with a plurality of holes 71 to provide for efficient ventilation of the transparent vessel 10.

Between the chamber 13 which contains the equipment, and the top of container 10, upwardly projecting into the hinged top cover 12, an upstanding duct 16 is arranged such that the inner space thereof will be completely isolated from the body of water, that is, with its upper open end located above the maximum level 38 of the body of said liquid, and its lower end welded or otherwise sealingly fastened to bottom 28 of transparent vessel 10, in order to provide for the passage of the different electric wires and fluid transfer ducts from chamber 13 to the space within said top cover 12 and to the lighting system 39, 45.

In this particular embodiment of the invention, and at the other end of the container, a water lifting pipe 32 is arranged which in this particular case can be left exposed, if desired, in which case this pipe is provided with a transparent or translucid structure so as to render air bubbles travelling upwardly therethrough, as will be fully explained hereinbelow, visible to the observer and therefore attractive and elegant. However, to improve the appearance, it is preferred to provide the water lifting pipe 32 in a concealed manner, preferably within the upstanding duct 16 (FIG. 3).

The pneumatic equipment of the aquarium in accordance with the present invention is driven by means of an air pump 18, electrically actuated through a lead wire, said pump 18 discharging air through a duct 19 which carries the air upwardly passing through duct 16 to reach the top and leading to the upper end of a safety trap 20, concealed by top cover 12, to avoid siphoning of the water upon accidental stoppage of the pump. From trap 20 a second air duct 21 is provided, downwardly directed and passing also through the upstanding duct 16, to carry the air to the lower chamber, down to an air distribution mnifold 22 provided with a plurality of valves 23 to suitably distribute air streams toward several conduits 24 carrying the air directly to bubble from bottom 28 of container 10, either to move several ornamental members 27, or simply to aerate the water as clearly shown in FIGS. 1 and 3 of the drawings.

Another conduit 25 leading from said distribution manifold 22 through an individual valve 23, discharges as an ejector into the elbow 26 of the water lifting pipe 32, in order to drive a plurality of air bubbles which entrain a constant water stream towards the top and discharge it through a bent portion 36 of pipe 32, outwardly of the discharge end 37 which expells the mixture of water and air in a diagonal direction. This end of pipe 32 is also concealed within top cover 12 of the aquarium. In accordance with this embodiment of the invention, as above mentioned, pipe 32 is manufactured of a transparent material such as glass or a suitable translucid plastic material whereby the ascending motion of the air bubbles through the water in the pipe will give a very attractive appearance which will render the water lifting pipe 32 very appealing to constitute an ornamental device within the body of the water in the transparent vessel or container 10.

The electrically conducting equipment comprises a cable 77 entering through a bore provided in one of legs 15 to concealingly lead up to chamber 13 where it is connected to a distribution box or panel 40 and thence to suitable switchboards (not shown) to distribute current to all lighting and driving elements included in the aquarium in accordance with the present embodiment.

A bed 34 containing pebbles or the like is provided at the bottom 28 of transparent vessel 10, through which the air ducts 24 discharge to bubble through the body of liquid by themselves or through actuation of ornamental movable devices such as the "milling wheel" 27 illustrated in FIG. 1 of the drawings.

The lighting system comprises one or more lamps, preferably fluorescent lamps 39, supported by means of suitable brackets 45 fixed on the undersurface of the hinged top cover 12 which covers the top of the transparent container 10. This lighting system is also supplied with electric energy by means of a cable 41 connected to the distribution box 40 through suitable switches (not shown).

The lower portion of the apparatus of the present invention is comprised by a cabinet 14 having one or more doors 17 which provide for its application as a liquor storage as well as to provide shelves for the storage of repair and replacement parts of the aquarium.

The safety system of the aquarium in accordance with the present invention, while not forming part of the invention, has been described and illustrated to point out that this aquarium, besides effecting the above described novel functions of cleaning, oxygenating and heating the water by means of a centralized system, also provides safety elements, since trap 20, when the pump 18 accidentally stops thus permitting entrance of water through the pipes 24 and pipes 21, breaks any possible siphoning action which could be established by the inertia of the water when flowing up through pipe 21. Therefore, pipe 19 which is connected to the discharge of the air pump 18 will never be able to carry water whichever the unfavorable conditions of pump stoppage or any other defect of the pneumatic system may be.

The centralized system for circulating, cleaning, aerating and heating the water will be now described. In accordance with the present embodiment, a drain 29 which can be provided with a foraminous sheet or strainer to avoid passage of large solid particles from the bed 44 used to cover the bottom 28 of the container 10, or of any other solid particle which may be accidentally dropped into container 10, is arranged at bottom 28 of vessel 10.

Drain 29 is connected to a vertical pipe 30 which other end is bent in an angular fashion to discharge liquid to filter 31. At the lower part of pipe 30 a bleeding pipe 35, see FIG. 3, is provided to bleed the aquarium upon opening of valve 58 when required for cleansing operations, replacement or repair of parts, and the like.

Pipe 30 is connected at its lower end to one side of filter 31 (which will be described later), and filter 31 is provided with the discharge pipe 32 which carries the water delivered from drain 29 by gravity to the filter and thence up to level 38. Air bubbles introduced by means of pipe 25 through an injector portion 26 push the water upwardly to flow through the return vent 36 and discharge opening 37 to thereby produce a thorough circulation of the water which will not be permitted to remain stagnant in any portion of the vessel 10. This circulation of the water is aided by the stirring action effected by the air injections through pipes 24, so that the body of liquid will always remain homogeneously cleaned and perfectly aerated or oxygenated by the thorough circulation of the water through filter 31 and by the injection of air through pipes 24 and 25 as described above.

In order to maintain the temperature of the body of water in the transparent container 10 substantially constant at any moment, a centralized heater 33 is provided in the central portion of filter 31 in accordance with the detailed description to follow. This heater 33 is connected by means of an electric cable 42 and plug 43 to an electric receptacle 44 supplied with elecrtic energy from the distribution box 40 through one of the lead wires 41. In this manner, as will be clearly apparent, it is possible to heat all the water passing through the filter to a constant temperature, thereby providing for the simultaneous heating, filtration and oxygenation of the water which is therefore maintained at the optimum conditions to support the physiological needs of the animal and vegetable living creatures in the aquarium. In addition, the heating of the water in the filter 31 lowers its density and aids lifting and circulating the water to the chamber 10.

Filter 31 incorporated in the centralized system for cleaning, heating and aerating water, comprises a cylindrical body 46 having on one of its ends an integral circular cover 48 and at the center, axially arranged to said body, a tube 49 throughout the length of the filter body 46. The end of tube 49 may be threaded and loosely permit the entrance of a cover 47 seated on an annular gasket 59, said cover being fastened in place by a nut 56 screwed on the end of tube 49. Also, cover 47 and tube 49 can be integrally built as a unit and then introduced into the cylindrical body 46 of the filter, with nut 56 attached to heater 33 and serving as a stop therefore, as shown in FIG. 2. Centrally arranged in the body 46, is a filtrating element 50 comprising a cylinder of active carbon 52 or the like, enclosed by two layers of fibrous material 51 and all the elements being supported by a pair of metallic fabrics 57 thereby forming a separable and interchangeable filtering element.

In accordance with the above, two separate chambers are formed in the filter, a chamber 75 for dirty water from pipe 30 and a chamber 76 for cleaned or filtrated water which leaves through pipe 32.

Tube 49, as shown in FIG. 2 of the drawings, is provided with an open mouth through which an electric heater 33 is inserted, said electric heater comprising a resistance or induction heating element arranged within an armored pipe 53 covered at one of its ends with a cap 54 and having at its other end a ferrule 55 centrally apertured to provide passage for cable 42 which is provided with a plug 43 at its opposite end for taking and conducting the necessary electric energy. This heater, as will be apparent, will heat the whole of pipe 49 thus providing a large heating surface in contact with the water which circulates through the filter and therefore maintaining the desired temperature throughout the body of water in the container 10.

In accordance with another embodiment of the present invention, the aquarium can be built in accordance with FIGS. 3 and 4 of the drawings, wherein identical reference characters are used to designate like parts in all the figures.

In accordance with this particular embodiment of the invention, the sewer 29 is omitted and the pipe 30 is directed through the concealing upstanding duct 16 upwardly to a level above the bottom 28 but under the body of water, where it is provided with a right angle bent or elbow leading through an opening 60 in said duct 16, in order to take the water from the container 10 at a level above the bottom of the said transparent container. Opening 60 which communicates pipe 30 with the body of liquid can be provided with a metallic strainer or the like to avoid large particles of foreign material to enter and overload the filter 31a. This connection 60 between the body of liquid and the centralized system for circulating, filtering, aerating and heating the water is provided at the above mentioned higher level in order to avoid accidental emtpying of the transparent container 10 and the consequent death of the living creatures living therein. In other words, if some connections in the water pipes, or if some of the fittings therein fails and produces leakage of the water, by the provision of the opening 60 at a higher level, emtying of the transparent container will be avoided since water will flow outwardly thereof only down to the level where opening 60 is located, leaving enough water to keep alive the living creatures in the aquarium. When it is desired to empty the aquarium for cleaning purposes or otherwise, in accordance with this particular embodiment of the invention, a right angle branch 61 is provided adjacent the bottom 28 of the aquarium. Branch 61 is open ended and is provided with a plug 62 to plug its opening. To emtpy the aquarium, it will be only necessary to remove plug 62 and open the bleeding valve 58 in order to permit flow of the water from the transparent container 10 outwardly through pipe 35.

In this particular embodiment of the invention, filter 31a is a slightly modified filter to be arranged in a vertical position and is provided with the tube 49 approximately at the center of the lower chamber 75 for dirty water as shown in FIG. 4 of the drawings. To provide for the washing of said filter and bleeding thereof, a pipe 68 is connected to the lower chamber 75 adjacent the bottom thereof.

This filter comprises a cover 63 provided with a disk portion 64 and a frustoconical portion 65 in order to engage the frustoconical opening 66 provided at the top cover 67 of the filter. As the filtering element is not supported by the wall 46 in this particular embodiment of the invention, a foraminous plate 69 is arranged transversely thereof to support the entire filtering element 50. Otherwise, the construction and performance of the aquarium shown in FIGS. 3 and 4 of the drawings is quite equivalent to those of the embodiment shown in FIGS. 1 and 2.

In view of the above, it can be seen that a very important improvement has been provided in aquariums in that the present invention provides a centralized system of filtration, heating and oxygenation of the water, which also incorporates a centralized system for circulating said liquid by bubbling air from the air pump to entrain the water and make it flow upwardly through a pipe, thus simultaneously oxygenating the water in the aquarium.

The above has the remarkable advantage of keeping the whole body of the water in the aquarium under conditions such that the living creatures will be provided with the most suitable environment. The additional safety means incorporated in the aquarium in order to avoid accidental emptying thereof is considered as another important feature of the invention which provides the advantage of avoiding any inadvertent disaster like the death of all the living creatures kept therein.

Although certain specific embodiments of the invention have been shown and described, it is to be understood that many modifications thereof are possible. The invention, therefore, is not to be restricted except insofar as is necessitated by the prior art and by the spirit of the appended claims.

Having thus described our invention what we claim as new and desire to protect by Letters Patent is:

1. An aquarium comprising a transparent vessel for containing water, ornamental devices and aquatic inhabitants; an opaque cover above said vessel defining a closed space; an opaque chamber below said vessel; a cabinet below said chamber; legs for supporting said cabinet, at least one of said legs being a hollow leg enclosing and concealing electrical connections and fluid conduits; an upstanding pipe in said transparent vessel communicating said opaque chamber with the space within said opaque cover for enclosing and concealing electrical connections and ducts for air to be bubbled through water in said transparent vessel; an air pump in said lower opaque chamber; a manifold in said lower chamber having valves to distribute air; safety means located within said cover above the transparent vessel and at a level which is higher than the maximum level to which water in the same vessel can reach to prevent water from going back towards the air pump when it is inadvertently stopped; a centralized system for circulating, aerating, heating and filtering the water which comprises, in combination, a filter, a first duct connecting said transparent vessel to one end of said filter, a second duct connecting the other end of said filter with a discharge tube passing upwardly through said upstanding pipe into said cover above the transparent vessel and discharging at a level higher than the maximum level to which the water in said vessel can reach, an air injector at the lower end of the vertical length of said second duct and a heater enclosed within said filter, interposed in the flow of the circulating water to continuously heat the same; and duct means connecting said pump to said safety means, said manifold and said air injector.

2. An aquarium comprising an upper chamber for housing fish and the like, a lower chamber housing operational equipment including an air pump and a centralized assembly for continuously circulating, aerating, heating and filtering water in said upper chamber, said assembly including a filter enclosure housing a filter unit and a heater, first duct means connecting said fish housing chamber to an inlet of the filter enclosure, second duct means connecting an outlet of the filter enclosure to the fish housing chamber for discharging filtered water thereto, and third duct means connecting said air pump to said second duct means to inject bubbles of air to the heated and filtered water therein, whereby the lifting of filtered water from the filter unit in the lower chamber to the upper chamber is engendered by both the injected air bubbles and the elevated temperature of said heater in the filter enclosure.

3. An aquarium comprising an upper chamber for housing fish and the like, a lower chamber housing a centralized assembly for continuously circulating, heating and filtering water in said upper chamber, said assembly including a filter enclosure housing a filter unit and a heater, first duct means connecting said fish housing chamber to an inlet of the filter enclosure, and second duct means connecting an outlet of the filter enclosure to the fish housing chamber for discharging filtered water thereto, whereby the lifting of filtered water from the filter unit in the lower chamber to the upper chamber is engendered by the elevated temperature of said heater in the filter enclosure.

4. An aquarium according to claim 2, wherein said filter enclosure is a horizontal cylindrical member and further houses a tubular envelope coaxially arranged within said member, said heater comprising a tubular electrical heater removably inserted within said envelope, said filtering unit being transversely arranged between the outer cylindrical member and the coaxial envelope, and said first and second duct means being connected to opposite ends of said horizontal cylindrical member.

5. An aquarium according to claim 2, wherein said filter enclosure is a vertical cylindrical member closed at the bottom, and provided internally with a radially extending tubular envelope, a filtering unit supported above said tubular envelope, and a pressure fit cover at the upper end of said member, said heater comprising an electric heater removably inserted within said tubular envelope, and said first and second duct means being connected to opposite ends of said vertical cylindrical member.

6. An aquarium according to claim 4, wherein said filtering unit comprises a central, annular body of active carbon, annular layers of fibrous material on each side of said active carbon body, and annular metal fabric members on the outer surfaces of said layers of fibrous material.

7. An aquarium according to claim 5, wherein said filtering unit comprises a central, disc-like body of active carbon, disc-like layers of fibrous material on each side of said active carbon body, disc-like metal fabric members on the outer surfaces of said layers of fibrous material, and a foraminous disc under one of said metal fabric members fastened to the wall of said cylindrical member.

References Cited
UNITED STATES PATENTS

| | | | |
|---|---|---|---|
| 1,976,906 | 10/1934 | Waldron | 210—185 X |
| 2,103,434 | 12/1937 | Pennebaker | 210—134 |
| 2,302,489 | 11/1942 | Brown | 210—184 X |
| 2,732,341 | 1/1956 | Huff | 119—5 X |
| 2,776,642 | 1/1957 | Sepersky | 119—5 |
| 2,981,228 | 4/1961 | Brandano | 119—2 |
| 3,025,831 | 3/1962 | Berardi | 119—5 X |
| 3,059,091 | 10/1962 | Wenzel | 210—169 X |
| 3,146,195 | 8/1964 | Berardi | 210—169 |

SAMUEL KOREN, *Primary Examiner.*

ALDRICH F. MEDBERY, *Examiner.*